United States Patent [19]

Nakamura

[11] Patent Number: 5,680,270
[45] Date of Patent: Oct. 21, 1997

[54] FLOPPY DISK APPARATUS WHICH ADJUSTS GAIN CONFORMING TO OPERATION OF CARRIAGE

[75] Inventor: Tomoaki Nakamura, Tokyo, Japan

[73] Assignee: NEC Corporation, Japan

[21] Appl. No.: 616,892

[22] Filed: Mar. 18, 1996

[30] Foreign Application Priority Data

Mar. 24, 1995 [JP] Japan .................................. 7-065513

[51] Int. Cl.$^6$ .................................................. G11B 5/596
[52] U.S. Cl. ...................................... 360/77.04; 360/77.07
[58] Field of Search ............................. 360/77.04, 77.07, 360/77.08, 77.11, 77.02, 77.01, 75; 369/43.34

[56] References Cited

U.S. PATENT DOCUMENTS

| | | | |
|---|---|---|---|
| 4,764,914 | 8/1988 | Estes et al. ................... | 360/77.04 X |
| 4,982,297 | 1/1991 | Tsujisawa ...................... | 360/77.04 |
| 5,065,263 | 11/1991 | Yoshida et al. .................. | 360/77.04 X |

FOREIGN PATENT DOCUMENTS

| | | | |
|---|---|---|---|
| 2-247830 | 10/1990 | Japan | G11B 7/095 |
| 4-271021 | 9/1992 | Japan | G11B 7/09 |
| 5-258330 | 10/1993 | Japan | G11B 7/095 |
| 5-282818 | 10/1993 | Japan | G11B 21/10 |

*Primary Examiner*—Andrew L. Sniezek
*Attorney, Agent, or Firm*—Hayes, Soloway, Hennessey, Grossman & Hage, P.C.

[57] ABSTRACT

The invention provides a floppy disk apparatus which can perform, where a carriage motor which makes a non-linear operation such as a linear stepping motor is employed, suitable gain adjustment conforming to operation of a carriage. Upon setting of a correction gain, the position of a magnetic head on a floppy disk medium is fixed by a main control section, and in this condition, servo information is read out from the floppy disk medium. From the servo information read out by the magnetic head, a tracking error signal is produced by a tracking error production section. Based on the thus produced tracking error signal, an operation amount calculation section calculates an operation amount of the carriage for one rotation of the floppy disk medium. A correction gain setting section calculates a correction gain based on the operation amount calculated by the operation amount calculation section, and sets the thus calculated correction gain to an operation amount correction section.

5 Claims, 4 Drawing Sheets

FIG. 4

| CARRIAGE OPERATION AMPLITUDE | CORRECTION GAIN |
|---|---|
| $A < A_1$ | $G_1$ |
| $A_1 \leqq A < A_2$ | $G_2$ |
| $A_2 \leqq A < A_3$ | $G_3$ |
| $A_3 \leqq A < A_4$ | $G_4$ |
| $A_4 \leqq A$ | $G_5$ |

FLOPPY DISK APPARATUS WHICH ADJUSTS GAIN CONFORMING TO OPERATION OF CARRIAGE

BACKGROUND OF THE INVENTION

1. Field of the Invention

This invention relates to a floppy disk apparatus for recording and reproducing a floppy disk medium, and more particularly to a floppy disk apparatus of large capacity which includes a carriage motor for non-linear operation, such as linear stepping motor.

2. Description of the Related Art

Various conventional floppy disk apparatus are known. An exemplary conventional floppy disk apparatus is shown in FIG. 5. Referring to FIG. 5, the floppy disk apparatus shown includes a magnetic head 52 mounted on a carriage not shown and driven by a motor 68 for reading out a read waveform 55 from a floppy disk medium 51, an amplifier 54 for amplifying the read waveform 55 read out by the magnetic head 52, and a tracking error detection section 56 for producing a tracking error signal 57 representative of position error information (tracking error) of the magnetic head 52 based on the waveform read out from a servo region of the read waveform 55 amplified by the amplifier 54.

The floppy disk apparatus further includes an operation amount calculation section 58 for calculating an operation amount 59 of the carriage from the tracking error signal 57, an operation amount correction section 60 for correcting the operation amount 59 calculated by the operation amount calculation section 58 with a predetermined correction gain, and an actuator driving section 66 for driving the motor 68 in accordance with the operation amount corrected by the operation amount correction section 60. A correction gain setting section 63 for setting a predetermined correction gain to the operation amount correction section 60 is provided for the operation amount correction section 60.

The correction gain setting section 63 includes a PP (peak-to-peak) detection section 61 for calculating the difference (fluctuation width) between a maximum value and a minimum value of the tracking error signal 57, a speed detection section 69 for calculating a relative speed of the magnetic head 52 to a track on the floppy disk medium 51, and a correction gain calculation section 70 for calculating a correction gain based on the outputs of the speed detection section 69 and the PP detection section 61.

Upon reading out of a waveform from the floppy disk medium 51, read waveform 53 read out by the magnetic head 52 is amplified by the amplifier 54. The thus amplified read waveform 55 is inputted to the tracking error detection section 56, by which tracking error signal 57 representative of position error information is produced based on the waveform read out from a servo region of the read waveform 55. The operation amount calculation section 58 calculates, based on the tracking error signal 57, an operation amount 59 with which the position error amount of the magnetic head 52 may be reduced to zero. Further, fluctuation width of the tracking error signal 57 is simultaneously calculated by the PP detection section 61, and relative speed of the magnetic head 52 to a track on the floppy disk medium 51 is calculated by the speed detection section 69.

Thereafter, correction gain is calculated based on the output of the PP detection section 61 and the output of the speed detection section 69 by the correction gain calculation section 70. The thus calculated correction gain is inputted to the operation amount correction section 60, by which the operation amount 59 is corrected with the correction gain to obtain corrected operation amount 62. The operation amount 62 is inputted to the actuator driving section 66 to drive the motor 68. Consequently, track follow-up control of the magnetic head is performed.

Here, if a motor which has a non-linear operation such as a 11near stepping motor is used as the motor 68 for positioning the magnetic head, then swinging motion of the carriage caused by rotation of a loaded floppy disk medium exhibits a comparatively large width or amplitude depending upon the degree of eccentricity or displacement of the loaded position of the medium. In this instance, also the motor system exhibits a high gain. If gain adjustment similar to that which is performed when the swinging motion exhibits a small width is performed under such a situation as just described, then the entire servo system exhibits a high gain. Consequently, control is liable to become unstable. Therefore, where a motor which has a non-linear operation is used with a large capacity floppy disk apparatus, gain adjustment suitable for the width of swinging motion of the carriage is required.

With the conventional floppy disk apparatus described above, however, since the correction gain is fluctuated by variation in relative speed of the magnetic head to a track on the floppy disk medium, particularly where the degree of eccentricity of the floppy disk medium is high, the carriage makes swinging motion of a large width although the carriage is in an on-track condition and the width of the tracking error variation is small. Consequently, the conventional floppy disk apparatus has the problem that it is difficult to distinguish large width swinging motion and small width swinging motion of the carriage based on the tracking error signal and it is difficult to perform suitable gain adjustment conforming to the operation of the carriage.

SUMMARY OF THE INVENTION

It is an object of the present invention to provide a floppy disk apparatus which can perform, when it employs a carriage motor which has a non-linear operation, such as a linear stepping motor, suitable gain adjustment conforming to the operation of the carriage.

In order to attain the object described above, according to the present invention, there is provided a floppy disk apparatus which comprises a magnetic head mounted on a motor-driven carriage for reading out servo information recorded on a floppy disk medium, a tracking error detection section for producing a tracking error signal corresponding to the servo information read out by the magnetic head, an operation amount calculation section for calculating, based on the tracking error signal produced by the tracking error detection section, an operation amount of the carriage with which the tracking error signal may be reduced to zero, an operation amount correction section for correcting the operation amount calculated by the operation amount calculation section with a preset correction gain, an actuator driving section for driving the motor in accordance with the corrected operation amount from the operation amount correction section, a main control section for controlling so that, upon setting of a correction gain, a position of the magnetic head on the floppy disk medium is fixed while the floppy desk medium makes at least one full rotation, and a correction gain setting section for determining a correction gain to be set to the operation amount correction section based on an operation amount of the floppy desk medium for one rotation calculated by the operation amount calculation section during operation of the head fixing function.

In the floppy disk apparatus, upon setting of a correction gain, the position of the magnetic head on the floppy disk medium is fixed by the main control section, and in this condition, servo information is read out from the floppy disk medium. From the servo information read out by the magnetic head, a tracking error signal is produced by the tracking error production section. Based on the thus produced tracking error signal, the operation amount calculation section calculates an operation amount of the carriage for one rotation of the floppy disk medium. The correction gain setting section calculates correction gain based on the operation amount calculated by the operation amount calculation section, and sets the thus calculated correction gain to the operation amount correction section.

With the floppy disk apparatus, since correction gain is set based on an operation amount of the carriage, it can be estimated clearly in advance whether the carriage has a large amplitude operation or a small amplitude operation. Consequently, depending upon whether it is estimated that the carriage has a large amplitude operation or a small amplitude operation, a different value can be set as the correction gain. Consequently, even when a motor whose gain varies depending upon the amplitude and has a non-linear operation, such as a linear stepping motor, is employed as the carriage motor, effective track follow-up control can be performed.

Further, since amplitude is calculated from non-correction operation amounts for one rotation of the floppy disk medium and correction gain is set based on the amplitude, optimum correction gain can be set readily.

The correction gain setting section may include peak-to-peak detection means for detecting amplitude of the operation amount calculated by the operation amount calculation section, and correction gain setting means for determining correction gain based on the amplitude of the operation amount detected by the peak-to-peak detection means and setting the determined correction gain to the operation amount correction section.

Preferably, the correction gain setting section has a correction gain table provided therefor for correlating the amplitude of the operation amount calculated by the operation amount calculation section and the correction gain, and has a table referring function for referring to the correction gain table to determine correction gain based on the amplitude of the operation amount. Where a correction value is acquired by referring to the correction gain table provided in advance based on the amplitude of the non-corrected operation amount, no calculation operation is required after the amplitude is calculated, until the correction gain is acquired based on the amplitude. Consequently, setting of a correction gain can be performed rapidly.

Preferably, the correction gain table correlates different ranges in value of the amplitude of the operation amount with different fixed values of the correction gain. When the correction gain table correlates the ranges in this manner, the correction gain table can be provided with minimum necessary size, and memory capacity can be minimized and reduction of apparatus cost can be achieved.

The correction gain values set to the correction gain table may be set based on a motor system gain curve which indicates a gain characteristic of the carriage motor with respect to amplitude of operation of the carriage. When the correction gain is set in advance based on the gain characteristic of the carriage motor, optimum correction gain can be set in accordance with the type of carriage motor employed, and stabilized track follow-up control can be performed.

More particularly, the correction gain values set to the correction gain table may be set based on a correction gain curve which is symmetrical with the motor system gain curve with respect to a motor system average gain straight light so that intermediate values of the correction gain curve within the individual ranges in value of the amplitude of the operation amount are set as the fixed values of the correction gain. Where the values of the correction gain are set so that the apparent gain characteristic of the carriage motor is equal to average value of the motor system gain, a servo system for large capacity floppy disk apparatus which employs a carriage motor which non-linear operation can be stabilized with the correction gain.

The above and other objects, features and advantages of the present invention will become apparent from the following description and the appended claims, taken in conjunction with the accompanying drawings.

BRIEF DESCRIPTION OF THE DRAWINGS

FIG. 4 is a diagram showing an outline of the correction gain table shown in FIG. 1.

DESCRIPTION OF THE PREFERRED EMBODIMENT

Figure 1:
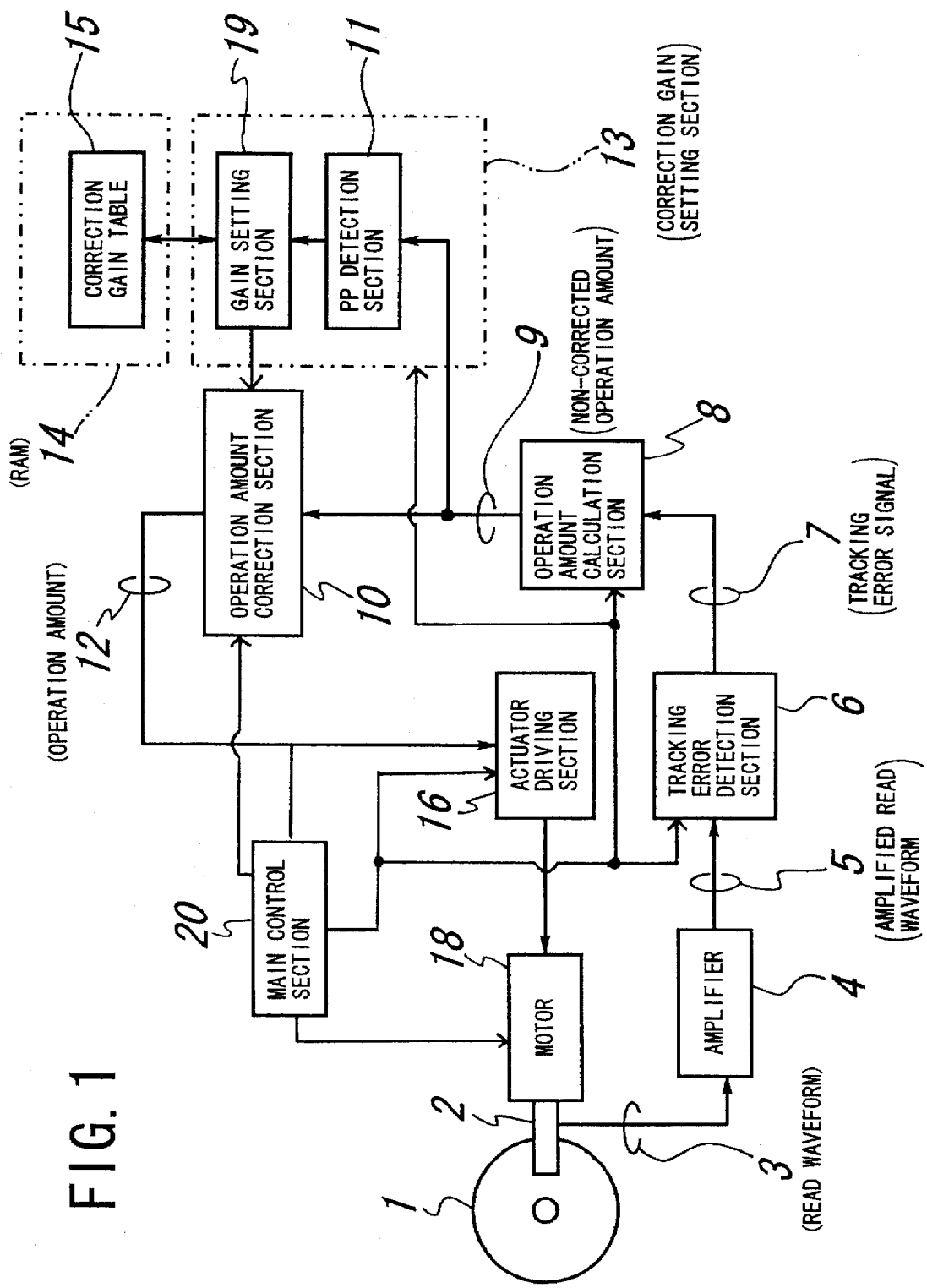
FIG. 1 is a block diagram of a floppy disk apparatus showing a preferred embodiment of the present invention.

Referring first to FIG. 1, there is shown a floppy disk apparatus to which the present invention is applied. The floppy disk apparatus shown includes a magnetic head 2 mounted on a carriage (not shown) driven by a motor 18 for reading out servo information recorded on a floppy disk medium 1 rotated by another motor not shown, a tracking error detection section 6 for producing a tracking error signal 7 corresponding to the servo information read out by the magnetic head 2, and an operation amount calculation section 8 for calculating, based on the tracking error signal 7 produced by the tracking error detection section 6, an operation amount of the carriage with which the tracking error signal 7 may be reduced to zero. The floppy disk apparatus further includes an operation amount correction section 10 for correcting an operation amount 9 calculated by the operation amount calculation section 8 with a preset correction gain, an actuator driving section 16 for driving the motor 18 in accordance with a corrected operation amount 12 corrected by the operation amount correction section 10, a correction gain setting section 13 for setting a predetermined correction gain to the operation amount correction section 10, and a main control section 20 for controlling operations of the individual elements mentioned above.

The main control section 20 has a head fixing function for fixing, upon setting of correction gain, position of the magnetic head 2 on the floppy disk medium 1 while the floppy disk medium 1 makes at least one full rotation. Meanwhile, the correction gain setting section 13 determines correction gain to be set to the operation amount correction section 10 based on operation amount 9 for one rotation of the floppy disk medium 1 calculated by the operation amount calculation section 8 during starting of the head fixing function by the main control section 20.

More particularly, the correction gain setting section 13 includes a PP detection section 11 for detecting amplitude A of the operation amount 9 calculated by the operation amount calculation section 8, and a gain setting section 19 for determining correction gain based on the amplitude A of the operation amount 9 detected by the PP detection section 11 and setting the thus determined correction gain to the operation amount correction section 10.

Actually, the correction gain setting section 13, the operation amount calculation section 8 and the operation amount correction section 10 are generally constructed from a one-chip CPU not shown. The functions of the sections are realized by the CPU sequentially executing microprograms installed in the CPU. Though not shown, the CpU includes RAM and ROM used for execution of various processes.

A correction gain table 15 for correlating the amplitude A of the operation amount 9 calculated by the operation amount calculation section 8 and the correction gain is provided for the gain setting section 19. The gain setting section 19 has a table referring function for referring to the correction gain table 15 to determine correction gain based on the amplitude A of the operation amount 9. The correction gain table 15 is stored in RAM 14 in advance. The correction gain table 15 may alternatively be stored in ROM.

The operation amount calculation section 8 adopts PI control. In particular, operation amount is calculated by calculating a sum of a result of addition of tracking error signal values of individual sectors and a value obtained by multiplying tracking error value at the present point of time by a certain coefficient and then multiplying the thus calculated sum by a predetermined coefficient.

The PP detection section 11 has a function of calculating amplitude of operation amount 9 from maximum value and minimum value of the operation amount 9 for one rotation calculated by operation amount calculation section 8.

In the present embodiment, the correction gain table 15 correlates fixed correction gains to different ranges in value of the amplitude A of the operation amount 9. The correction gains set to the correction gain table 15 are set based on a motor system gain curve indicating a gain characteristic of the operation amount calculation section 8 with respect to the amplitude of operation of the carriage. More particularly, the correction gain values set to the correction gain table 15 are set based on a correction gain curve which is so formed as to be symmetrical with the motor system gain curve with respect to a motor system average gain straight line so that they may have intermediate values within individual ranges in value of the amplitude A of the operation amount 9.

A procedure of production of the correction gain table will be described in detail below.

Figure 2:
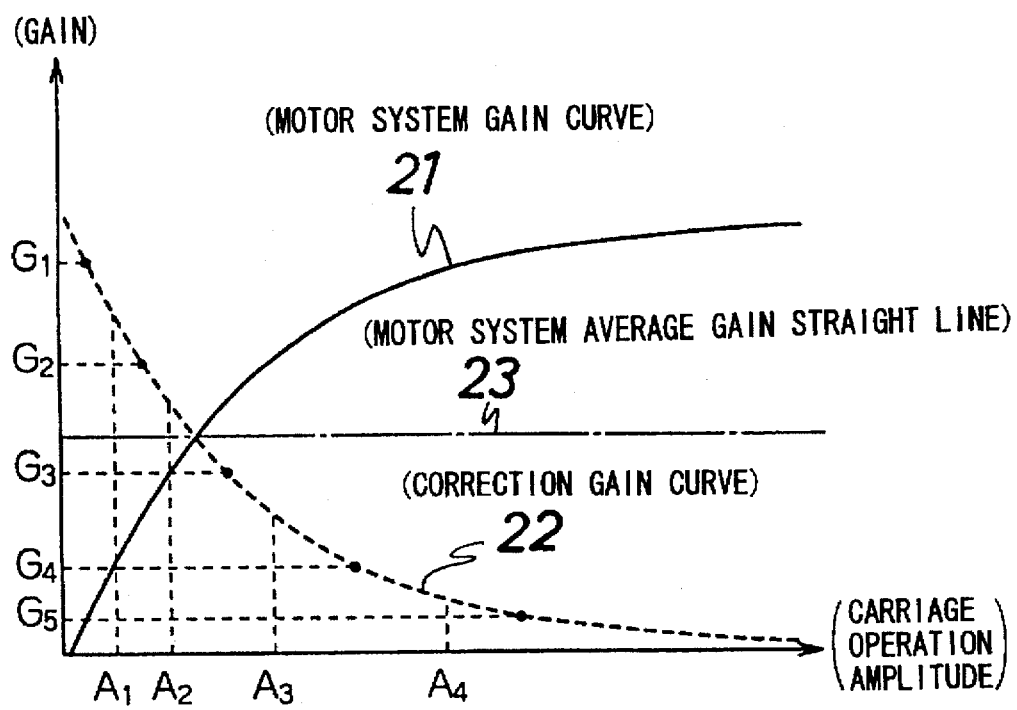
FIG. 2 is a diagram illustrating a procedure for acquiring values of correction gain to be set to a correction gain table shown in FIG. 1.

Production of the correction gain table depends upon the gain characteristic of a motor used as the carriage motor. In the present embodiment, a linear stepping motor which makes a non-linear motor is employed as the carriage motor. Here, a characteristic curve indicating relationship between amplitude of operation of the carriage and gain of the motor 18 is shown in FIG. 2. Of curves shown in FIG. 2, the solid line curve indicates motor system gain curve 21 with respect to amplitude of operation of the carriage.

Referring to FIG. 2, correction gain curve 22 with which an apparent motor system gain is corrected to motor system average gain straight line 23 is considered first. The correction gain curve 22 is symmetrical with the motor system gain curve 21 with respect to the motor system average gain straight line 23. Then, the amplitude A of the non-corrected operation amount is divided into several ranks or ranges of 0 to A1, A1 to A2, A2 to A3, A3 to A4, and greater than A4, and corresponding marks are applied to the motor system gain curve 21. Then, the correction gain corresponding to an intermediate value of each of the ranks is determined as correction gain of the rank. In particular, in FIG. 2, if the amplitude A is within the range of 0 to A1, then correction gain G1 corresponds to the rank. If the amplitude A is within the range of A3 to A4, then correction gain G4 corresponds to the rank. A correction gain table produced by such correlation as described above is shown in FIG. 4. In FIG. 4, the term "carriage operation amplitude" has the same meaning as the non-corrected operation amount. The values of A1, A2, A3 and A4 may be set suitably.

Subsequently, operation of the entire floppy disk apparatus will be described.

In the present floppy disk apparatus, setting of correction gain is performed upon loading of a floppy disk medium 1. When the floppy disk medium 1 is loaded into the apparatus body, the main control section 20 detects it and drives the carriage to calibrate the magnetic head 2 to the position of a zero cylinder. Thereafter, the main control section 20 activates the head fixing function to fix the positions of the carriage and the magnetic head 2. In this condition, servo information recorded on a track at the zero cylinder is read in by the magnetic head 2.

Read waveform 3 read out by the magnetic head 2 is amplified by an amplifier 4. A thus amplified read waveform 5 is inputted to the tracking error detection section 6, by which tracking error signal 7 is produced from the servo information in the read waveform 3. Here, the tracking error signal 7 represents position error information, that is, a deviation between the head position and correct position of the track.

The tracking error signal 7 thus produced is inputted to the operation amount calculation section 8. The operation amount calculation section 8 calculates a non-corrected operation amount 9 of the carriage with which it is estimated to make the value of the received tracking error signal 7 equal to zero. Here, a graph representing values of the operation amount 9 calculated for one rotation is shown in FIG. 3.

Figure 3:
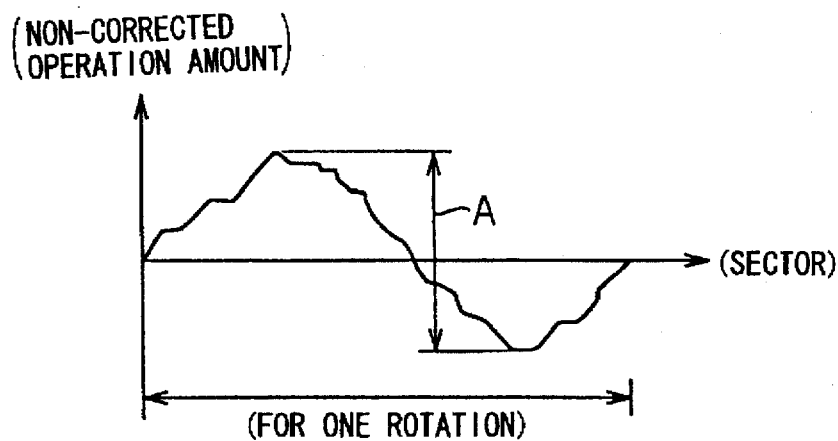
FIG. 3 is a diagram illustrating an example of a non-corrected operation amount for one rotation of floppy disk medium in the floppy disk apparatus of FIG. 1.
Figure 5:
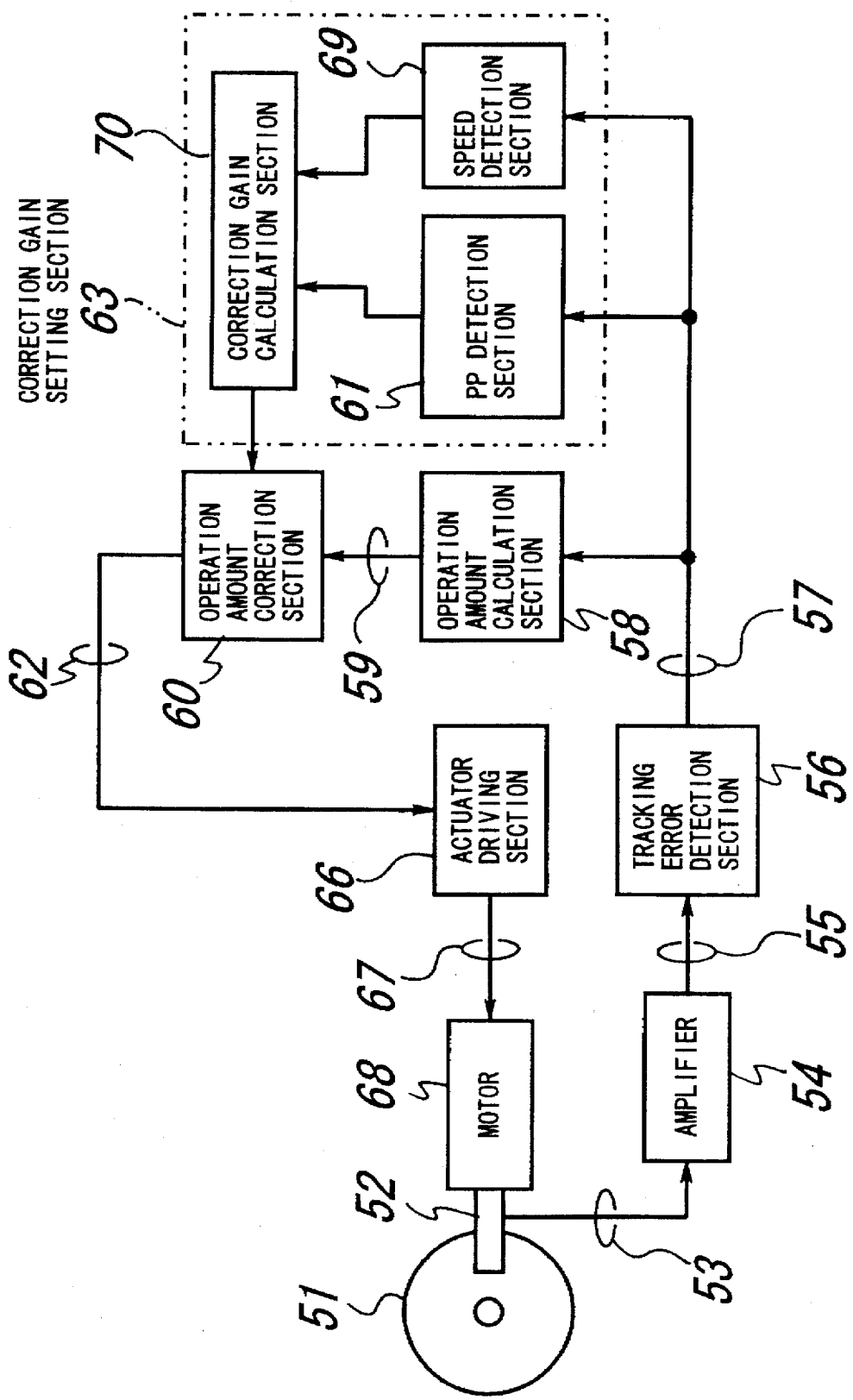
FIG. 5 is a block diagram of a conventional floppy disk apparatus.

Then, the PP detection section 11 calculates, from the operation amount 9 calculated by the operation amount calculation section 8, maximum value and minimum value of it and calculates difference between them to detect the amplitude A of the non-corrected operation amount illustrated in FIG. 3. Then, the operation amount correction section 10 acquires the amplitude A of the operation amount 9 calculated by the PP detection section 11, refers to the correction gain table 15 to determine optimum correction gain G and sets the thus determined correction gain G as correction gain for later operation amount correction to the operation amount correction section 10. Here, if the amplitude A of the operation amount 9 falls, for example, between A2 and A3, then the correction gain G3 is determined as the gain for later operation amount correction.

Thereafter, upon ordinary reading out and writing of data, a non-corrected operation amount 9 is calculated in accordance with servo information acquired for each sector of the floppy disk medium 1. Then, the operation amount 9 is inputted to the operation amount correction section 10 and multiplied by the preset correction gain G by the operation amount correction section 10. The thus corrected operation amount is inputted to the actuator driving section 16.

Consequently, the actuator driving section 16 drives the motor 18 to correct the position of the magnetic head 2 so that the position error of the magnetic head 2 with respect to the current track may be reduced to zero.

In this manner, with the floppy disk apparatus, since correction gain is set based on operation amount of the carriage, it can be estimated clearly whether the carriage has a large amplitude operation or a small amplitude operation. Consequently, the correction gain can be set to different values whether it is estimated that the carriage has a large amplitude operation or a small amplitude operation, and even where a non-linearly operating carriage motor whose gain varies depending upon the amplitude, such as a linear stepping motor, is used, effective track follow-up control can be performed.

Further, since amplitude is calculated from non-correction operation amounts for one rotation of a floppy disk medium and correction gain is set based on the amplitude, optimum correction gain can be set readily. Further, since correction value is acquired by referring to a correction gain table provided in advance based on the amplitude of the non-corrected operation amount, no calculation operation is required after the amplitude is calculated until the correction gain is acquired based on the amplitude. Consequently, setting of correction gain can be performed rapidly.

In addition, since the correction gain table is constructed such that different fixed correction gains are correlated with different ranges in value of the operation amount, the correction gain table can be provided with a minimum necessary size, and memory capacity can be minimized and reduction of apparatus cost can be achieved. Further, since the values of the correction gain set to the correction gain table are set in advance based on the gain characteristic of the carriage motor, optimum correction gain can be set in accordance with the type of carriage motor employed, and stabilized track follow-up control can be performed.

Further, since the values of the correction gain are set so that the apparent gain characteristic of the carriage motor may be equal to average value of the motor system gain, also a servo system for a large capacity floppy disk apparatus which employs a carriage motor which has a non-linear operation can be stabilized with the correction gain.

While the correction gain is set, in the embodiment described above, upon loading of a floppy disk medium, the setting may alternatively be performed, for example, upon switching on of the power supply to the apparatus body.

Having now fully described the invention, it will be apparent to one of ordinary skill in the art that many changes and modifications can be made thereto without departing from the spirit and scope of the invention as set forth herein.

What is claimed is:

1. A floppy disk apparatus, comprising:

a magnetic head mounted on a motor-driven carriage for reading out servo information recorded on a floppy disk medium;

a tracking error detection section for producing a tracking error signal corresponding to the servo information read out by said magnetic head;

an operation amount calculation section for calculating, based on the tracking error signal produced by said tracking error detection section, an operation amount of said carriage with which the tracking error signal may be reduced to zero;

an operation amount correction section for correcting the operation amount calculated by said operation amount calculation section with a preset correction gain;

an actuator driving section for driving said motor in accordance with the corrected operation amount from said operation amount correction section;

a main control section for controlling so that, upon setting of a correction gain, a position of said magnetic head on the floppy disk medium is fixed while the floppy disk medium makes at least one full rotation; and a correction gain setting section including peak-to-peak detection means for detecting an amplitude of the operation amount calculated by said operation amount calculation section based on an operation amount of the floppy disk medium for one rotation during operation of the head fixing function and correction gain setting means for determining a correction gain based on the amplitude of the operation amount detected by said peak-to-peak detection means and setting the determined correction gain to said operation amount correction section.

2. A floppy disk apparatus as claimed in claim 1, wherein said correction gain setting section has a correction gain table provided therefor for correlating the amplitude of the operation amount calculated by said operation amount calculation section and the correction gain, and has a table referring function of referring to said correction gain table to determine a correction gain based on the amplitude of the operation amount.

3. A floppy disk apparatus as claimed in claim 2, wherein said correction gain table correlates different ranges in value of the amplitude of the operation amount with different fixed values of the correction gain.

4. A floppy disk apparatus as claimed in claim 3, wherein the correction gain values set to said correction gain table are set based on a motor system gain curve which indicates a gain characteristic of a carriage motor with respect to an amplitude of operation of said carriage.

5. A floppy disk apparatus as claimed in claim 4, wherein the correction gain values set to said correction gain table are set based on a correction gain curve which is symmetrical with the motor system gain curve with respect to a motor system average gain straight light so that intermediate values of the correction gain curve within the individual ranges in value of the amplitude of the operation amount are set as the fixed values of the correction gain.

* * * * *